Sept. 16, 1924.

C. A. BORNMANN, JR
WINDING KEY FOR CAMERAS
Filed Jan. 29, 1924

1,508,589

INVENTOR
CARL A. BORNMANN JR.
BY
*Philip S. Hopkins*
ATTORNEY

Patented Sept. 16, 1924.

1,508,589

UNITED STATES PATENT OFFICE.

CARL A. BORNMANN, JR., OF BINGHAMTON, NEW YORK, ASSIGNOR TO ANSCO PHOTO-PRODUCTS, INCORPORATED, OF BINGHAMTON, NEW YORK.

WINDING KEY FOR CAMERAS.

Application filed January 29, 1924. Serial No. 689,268.

*To all whom it may concern:*

Be it known that I, CARL A. BORNMANN, Jr., a citizen of the United States, and a resident of the city of Binghamton, county of Broome, and State of New York, have invented a new and useful Improvement in a Winding Key for Cameras, of which the following is a description, reference being had to the accompanying drawing, which forms a part of this application.

My invention relates to photographic cameras embodying roll film and has to do particularly with an improved form of winding key for rotating the mandrel upon which the film is wound.

The primary object of my invention is simplicity in a device of this character and to that end I have devised a key involving a limited number of parts, each extremely simple and inexpensive to manufacture and which when assembled provides a most practical and efficient key.

A further object is to construct this key in a manner to permit ease of operation and at the same time present an ornamental and attractive appearance when secured in its place on the camera body.

A third object is to provide a friction plate or a washer for the stem of the key which through its resiliency will frictionally retain the stem in any set position and which will at the same time permit ready manipulation of the key.

It is also my object to construct a key which when assembled will be extremely compact and simple to mount on the camera thus eliminating considerable time and labor which is necessary in the use of the present day type of keys.

Other objects and advantages in details of construction and operation will be apparent as the description proceeds, reference being had to the accompanying drawings wherein like reference numerals indicate like parts.

In the drawing:—

Figure 1:
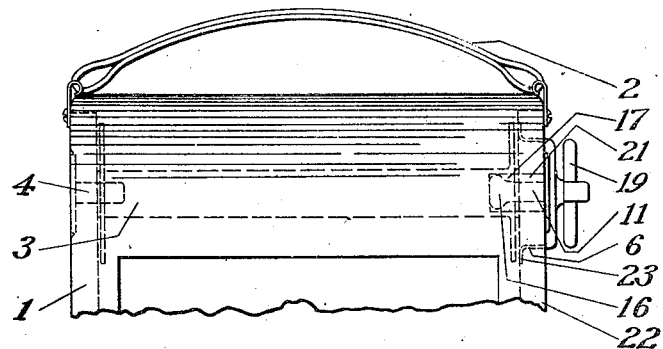
Figure 1 is a front view of the top of a camera provided with my improved key, the same being shown in dotted lines engaged with a film spool or mandrel within the camera.
Figure 2:
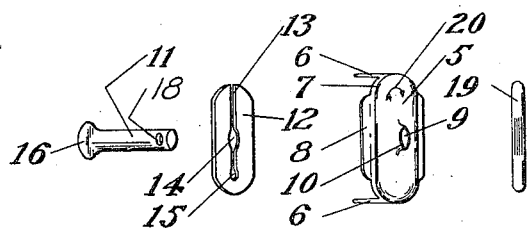
Figure 2 is a perspective showing the various parts of the key in exploded position.
Figure 3:
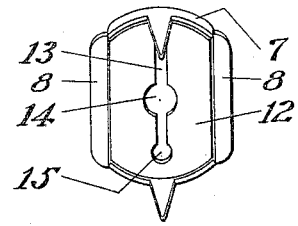
Figure 3 is a detailed view showing the friction plate in position within its housing.

By the reference numeral 1 is indicated broadly a camera of the roll film type provided with the usual carrying handle 2. Within the camera I have shown in dotted lines the take-up spool or film mandrel 3 engaged at one end by the usual spool pin 4 which provides a bearing at this end upon which the spool rotates. These parts are of the conventional type in general use and may be of the particular construction shown or may be varied in any manner to suit the particular model of camera in which they are mounted, as for instance a box camera.

In devising a key with which to rotate the spool 3, I have provided a housing 5 which is stamped in one piece from sheet metal or other suitable material and which is provided at each end with securing prongs 6. The housing 5 is drawn up slightly at its edges to form side walls or flanges 7, these side walls creating a pocket within the housing. The two side flanges 7 are extended as at 8, such extension being formed at right angles to the flanges and forming ears providing a flat bearing surface for the housing against the side of the camera. An opening 9 is provided through the center of the housing and the material around the same drawn up slightly as at 10 to provide a suitable bearing surface for the key stem 11 which projects thru said opening. The construction just described creates besides a useful mount for the winding key, a very attractive and ornamental fixture or trimming for the camera.

Shaped to fit snugly within the walls of the housing 5 is a friction plate 12. This friction plate is split endwise the major portion of its length as at 13, thus lending considerable resilience thereto. The slot 13 is enlarged centrally of the plate to form a circular opening 14 thru which the key stem 11 extends, this opening aligning with the opening 9 when the plate is placed in the housing 5. The end 15 of the slot is also slightly enlarged to add to the resiliency of the plate.

The stem 11 is flattened at one end forming a web 16 which when the key is mounted on the camera, is adapted to extend into the key slot 17 in one end of the spool 3. The stem 11 is pierced at its opposite end at 18 to receive the thumb piece or handle 19.

When the various parts heretofore described are assembled it will be readily understood that the stem 11 may be turned in its bearing 10 and in the opening 14, the resilience of the plate 12 being sufficient to frictionally engage the stem and prevent its accidental rotation. The side walls or flanges 7 of the housing prevent the friction plate from expanding outwardly so that the sides of the enlarged portion 14 of the slot maintains at all times a friction grip upon the stem. A pointer 20 or other suitable indicator is placed upon the top of the housing 5 to indicate the proper direction to turn the key in winding the film.

In mounting the key upon the camera, the stem 11 is projected into the film chamber of the camera through the opening 21 in the side piece 22. The prongs thus are driven through the side 22 and the inner ends bent back and securely clamped to the inner side of the wall 22 as shown at 23.

The operation of the key is obvious from the foregoing description it being necessary simply to rotate the stem 11 through the medium of the thumb piece 19. To disengage the key from the spool, the stem 11 may be pulled outwardly in Figure 1 until the web 16 is free of the recess or key slot 17. The enlarged end or web 16 of the stem obviously prevents its complete withdrawal through the friction plate. The friction plate is clamped between the side of the camera and the housing 5 when the assembled key is mounted on the camera.

It will be seen that my improved winding key is extremely simple both in construction and in operation and of such nature that it may readily be mounted upon any type of camera using roll film. Of course the exact form shown and described is to be taken as illustrative only for obviously the device is susceptible to various changes in details of construction and operation without departing from the scope of the invention. I do not therefore, limit myself to the form as shown other than by the appended claims.

I claim:—

1. A winding key for cameras comprising a housing, a friction plate in said housing, and a stem engaged by said friction plate.

2. A winding key for cameras comprising a housing, a one piece friction plate, and a stem engaged by said friction plate.

3. A winding key for cameras, comprising a housing, a friction plate in said housing slotted a portion of its length, and a stem extending thru said slot and being frictionally engaged by said plate.

4. A winding key for cameras comprising a housing provided with sides forming a pocket, a friction plate in said pocket, a stem extending thru said housing and friction plate, the sides of said housing adapted to engage the edges of said plate at all times whereby said plate is in constant frictional engagement with said stem.

5. A winding key for cameras comprising a housing, a friction plate in said housing provided with a slot thru the major portion of its length, said slot being enlarged at its center to frictionally receive a stem and means on said housing for holding said plate in constant frictional contact with said stem.

6. A winding key for cameras comprising a housing, a friction plate in said housing slotted thru a major portion of its length and provided centrally of said slot with an opening, a stem extending thru said opening, and the inner end of said slot being enlarged.

7. A winding key for cameras comprising a housing, provided with an opening, a friction plate in said housing, a stem extending thru said housing and plate, the material adjacent said opening being drawn outwardly forming an elongated bearing for said stem.

8. A winding key for cameras comprising a housing, provided with an opening, a friction plate in said housing, a stem extending thru said housing and plate, the material adjacent said opening being drawn outwardly forming an elongated bearing for said stem, and said stem being flattened at one end to form a web.

CARL A. BORNMANN, Jr.